United States Patent [19]

Hewitt

[11] Patent Number: 4,961,538
[45] Date of Patent: Oct. 9, 1990

[54] ADAPTABLE IRRIGATION VALVE OPERATION SYSTEM

[76] Inventor: Ronnie D. Hewitt, Rte. 1, Bo 48, Oakley, Id. 83346

[21] Appl. No.: 179,078

[22] Filed: Apr. 8, 1988

[51] Int. Cl.⁵ .............................................. B05B 3/00
[52] U.S. Cl. .............................. 239/728; 251/129.03; 251/129.12; 239/582.1; 137/269
[58] Field of Search ...................... 251/129.03, 129.11, 251/129.12, 129.13; 137/487.5, 269; 403/3, 4; 74/89.15; 239/728, 582.1, 581.1

[56] References Cited

U.S. PATENT DOCUMENTS

| | | | |
|---|---|---|---|
| 2,302,695 | 11/1942 | Kalix | 251/18 |
| 2,704,947 | 3/1955 | Hopkins | 74/89.15 |
| 3,011,509 | 12/1961 | Wilson | 137/122 |
| 3,063,298 | 11/1962 | Elliott | 74/89.15 |
| 3,066,758 | 12/1962 | Turner | 184/7 |
| 3,077,960 | 2/1963 | Lang | 403/4 |
| 3,113,473 | 12/1963 | Morlen | 74/785 |
| 3,318,171 | 5/1967 | Wilkinson et al. | 74/89.15 |
| 3,334,859 | 8/1967 | Raymond, Jr. | 251/134 |
| 3,354,730 | 11/1967 | Thompson | 239/242 |
| 3,575,378 | 4/1971 | Fawkes | 74/89.15 |
| 3,615,056 | 10/1971 | Weiss | |
| 3,679,172 | 7/1972 | Kerkau | 74/89.15 |
| 3,993,091 | 11/1976 | Loveless | 137/269 |
| 4,210,169 | 7/1980 | Palma | 137/487.5 |
| 4,460,154 | 7/1984 | Kunkle | 251/129.03 |
| 4,559,843 | 12/1985 | Nilsson | 403/3 |
| 4,600,355 | 7/1986 | Johnson | 403/3 |
| 4,611,617 | 9/1986 | Hewitt | 251/129.12 |
| 4,712,441 | 12/1987 | Abraham | 74/89.15 |

FOREIGN PATENT DOCUMENTS 586972 11/1959 Canada .
0010416 4/1980 European Pat. Off. .

OTHER PUBLICATIONS

Raymond Control Systems "Valve Actuators and Controls".

Primary Examiner—Andres Kashnikow
Assistant Examiner—Christopher G. Trainor
Attorney, Agent, or Firm—Workman Nydegger & Jensen

[57] ABSTRACT

A valve operation system particularly well suited for remote and/or automatic operation of many different irrigation valves. A linear actuator is provided with a rod which extends from and retracts into a housing. A connecting arm assembly interconnects the valve stem and the rod such that the extension and retraction of the rod is transferred into the rotational motion of the valve stem and the operation of the valve. The system components are held in place by a mounting plate which may be secured to a number of different valves. A manual operation assembly is included to allow a user to manually open or close the valve if necesasary. A valve stem adaptor is also provided to allow embodiments of the present invention to be adapted to the different valve stems found on various valves. Thus, one embodiment of the present invention may be adapted to be used with several different valves while providing reliable operation.

42 Claims, 3 Drawing Sheets

ADAPTABLE IRRIGATION VALVE OPERATION SYSTEM

BACKGROUND

1. The Field of the Invention

This invention relates to valves used to control the flow of a liquid through a pipe. More particularly, the present invention relates to devices used to remotely and/or automatically operate irrigation valves.

2. The Background Art

In many parts of the world, and particularly in the Western United States, the efficient production of agricultural products requires that the natural rainfall be supplemented with irrigation water. Many times such irrigation water travels long distances from far away reservoirs and rivers to arrive at the farmer's fields.

Irrigation systems began to be used in the Western U.S. in the late 19th century. Such early irrigation systems generally consisted of a series of canals and ditches which were capable of transporting water from a reservoir or river to adjacent the farmer's field. The water would then be diverted from the canal or ditch down the furrows between the crops in the field. Since the early implementation of irrigation, irrigation systems have become much more sophisticated.

Many current irrigation systems are comprised of complex systems of pipes which carry water pumped from a canal, underground aquifer, or other source to the field. The main pipes used in modern irrigation systems may be twelve inches in diameter and carry 1,000 gallons or more of water per minute.

Rather than direct the water down the furrows, modern irrigation systems generally employ sprinklers to efficiently disperse the water among the crops. It is common for such sprinklers to be mounted above the crops on a wheeled structure which moves through the field. Some sprinkling systems include many sprinkler heads arranged in a row along a pipe, which may be as long as 1,000 feet or longer, which progressively moves in a row across a farmer's field.

Such sprinkling systems provide much more benefit per gallon of water applied to the crops than merely sending the water down the furrows. Each such sprinkler system may irrigate many acres of crops. Large farming operations may include many such irrigation systems watering hundreds or thousands of acres.

Importantly, the timing and the duration of irrigation is important. For example, it may be necessary to operate some sprinkler systems during the hours of the night when evaporation will be at a minimum. Furthermore, many sprinklers may be located quite some distance from the farmer's home or office. For these reasons, and for convenience of operation, many sprinkler systems may be remotely operated or employ automatic systems to control their operation.

The control of the flow of water through the sprinklers is effected by one or more valves which include an automatic operation mechanism. The valves typically used are generally referred to as "butterfly valves" which are operated between fully opened position and a fully closed position by rotating the valve stem about 90°.

In the past, it has been customary to utilize electric motors in cooperation with a series of gears and/or chains to rotate the valve stem. The use of electrical motors allows electrical control circuits to be used which may be conveniently programmed by the farmer to operate the valves and other irrigation equipment. Thus, the farmer is provided with the ability to remotely, and even automatically, irrigate a predetermined area on his farm with a predetermined amount of water.

While such automatically operated valves have many advantages, it is clearly impractical for the farmer to check the condition of each valve before it is operated. Importantly, such irrigation valves must operate reliably under harsh conditions where dust, dirt, extreme temperatures, and moisture tends to damage their electromechanical components. The presence of such contaminates and harsh environmental conditions causes many valves and valve operators to wear out quickly or be damaged.

It is current practice in most conventional irrigation systems to employ a valve which is operated by a small electric motor connected to the valve by way of plastic gears or gears and a metal drive chain. The typical motor widely used on smaller pipes (e.g., two to four inch diameter pipes) is a one-eighth horse power electric motor. The gears associated with the motor are generally fabricated from a plastic such as nylon or teflon.

Unfortunately, many motors used in prior art devices do not have adequate safety shut-off mechanism. As a result, if dirt or other types of obstructions enter the gears or the valve, the motor continues to turn until either the motor is damaged or the gears are rendered unusable.

Thus, the prior art devices are in need of regular maintenance, repair, and/or replacement in order to keep the irrigation system constantly in working order. A further difficulty with the prior art devices is that the parts used therein are often not generally available as replacement parts.

Aggravating this problem is the fact that every manufacturer adopts a different configuration for the shape of the valve stem and the mounting holes on the head of the valve such that the valves of each manufacturer require an operation system adapted for use with that particular valve.

Furthermore, manufacturers will often change the configuration of such parts periodically to require the farmer to purchase entirely new replacement items. Thus, it is often necessary to replace the entire valve operator at a substantial expenditure of money and time. The situation also leads to the situation where a farmer may have, for example, ten automatically operated valves on his farm each requiring different replacement parts.

Additionally, in an effort to shield the previously available devices from the effects of contaminants, some are housed in sealed cabinets. However, sealing the motor and its associated components in a cabinet often results in problems with condensation on the interior of the cabinet resulting in corrosion of the components. Additionally, the inclusion of a sealed cabinet increases the cost and complexity of the valve operator.

An additional drawback inherent in the previously available devices include the fact that no structure is provided the farmer which allows easy manual opening and closing of the valve should the valve operation system become disabled due to damage or a power failure.

Also, an appropriate valve closing time is critical to proper operation of an irrigation system because closing a valve too rapidly results in a pressure buildup which may burst a pipe. Accordingly, with previously available devices it is necessary to maintain a supply of different motors each having different rotation speeds or a supply of various sized gears and chains in order to obtain the proper closing time for the valve.

From the perspective of the farmer or the field service representative charged with repairing and maintaining a plurality of sprinkler systems scattered over perhaps an area covering hundreds of miles, the nonstandardization of parts among the different valves and operation systems presents a great disadvantage. Because of this nonstandardization, a large inventory of different replacement parts must be carried about in the field vehicle at all times since quick, around-the-clock repair service is the rule during the irrigation season.

In view of the foregoing, it would be an advance in the art to provide an irrigation valve operation system wherein either a single or a few different embodiments may be adapted for use with a plurality of differently configured valves whereby the need to keep on hand a plurality of different replacement parts for the embodiment is eliminated. It would also be an advance in the art to provide such an irrigation valve operation system which is readily interfaced with existing control systems. It would be a further advance in the art if the irrigation valve operation system made use of easily obtainable or easily fabricated replacement parts.

In addition to the foregoing, it would also be an advance in the art to provide an irrigation valve actuation system which is less susceptible to damage than previously available devices and which need not be completely enclosed in a sealed housing to provide reliable service. It would be a still further advance in the art to provide an irrigation valve actuation system which requires less maintenance than previously available devices performing similar functions and which may be adapted to be used with a range of valves of different sizes and capacities.

OBJECTS AND BRIEF SUMMARY OF THE INVENTION

In view of the before-mentioned difficulties and drawbacks found in the prior art, it is a primary object of the present invention to provide an irrigation valve operation system which may be used with a variety of differently configured irrigation valves.

It is also an object of the present invention to provide an irrigation valve operation system which is resistant to damage and premature wear.

Another object of the present invention is to provide an irrigation valve operation system which requires little maintenance and utilizes readily obtainable or easily fabricated parts.

A further object of the present invention is to provide an irrigation valve operation system which may be readily adapted to provide different closing rates for various irrigation valves.

Yet another object of the present invention is to provide an irrigation valve operation system which provides reliable operation under harsh conditions and does not require enclosure within a sealed housing for protection from the surrounding environment.

Still another object of the present invention is to provide an irrigation valve operation system which allows easy service and incorporates a minimum number of parts which are easily replaceable.

Another object of the present invention is to provide an irrigation valve operation system which may be used on both large and small valves.

A further object of the present invention is to provide an irrigation valve operation system which may be operated by conventional electrical irrigation control systems.

It is still another object of the present invention to provide an irrigation valve operation system which allows manual opening and closing of the valve without removal or disconnection of any of the apparatus components.

Consistent with the foregoing objects, the present invention incorporates a linear actuator, also referred to as a reciprocating rod means, rather than the typical rotary motors commonly employed in previously available devices.

The linear actuator is suitably housed to withstand physical damage and exposure to the harsh environments encountered by irrigation systems. The reciprocating rod of the linear actuator may be extended or retracted upon the application of proper signals from the irrigation system control circuitry. While the presently preferred embodiments utilize a linear actuator having an electric motor, other power schemes such as a hydraulic or pneumatic linear actuator may also be incorporated into the present invention.

The reciprocating motion of the linear actuator rod is translated into rotational motion for opening and closing the valve by way of a connecting arm assembly or connecting arm means. At its proximal end, the connecting arm assembly is attached to the valve stem and at its distal end the connecting arm is pivotally fixed to the linear actuator rod such that as the rod is extended and retracted from its housing the valve stem is rotated thus opening or closing the valve. While the present invention has application in many different circumstances, it is particularly advantageous when used with one of the many configurations of irrigation valves generally known as butterfly valves.

Furthermore, the present invention may include a valve stem adaptor which is provided with a plurality of different valve stem receptacles so as to be adaptable for use with several differently configured valve stems. The connecting arm assembly may include the valve stem adaptor as well as one or more extension arms which allow the effective length of the connecting arm assembly to be varied. As the effective length of the connecting arm assembly is varied the opening and closing times of the valve is also variable as well as the torque applied to the valve stem by the linear actuator.

A limit switch (which may comprise switches known in the art as "microswitches"), included in the control circuit of the present invention, senses when the valve has been fully opened or fully closed and applies or removes power to the linear actuator. The control circuit may include automatic devices to provide operation of the valve at regular intervals or the control system may be operated from a remote location by way of, for example, a cable.

The components of the present invention are interconnected by a mounting plate, which is also generally referred to as a mounting means. The mounting plate is provided with one or more sets of mounting holes, each set of mounting holes allowing the mounting plate to be mounted on several different valve bodies.

A manual operation means is also provided to allow a user to manually open and close the valve without disconnecting or removing the components of the system. It will be appreciated that by use of the above mentioned structures, an embodiment of the present invention may be adapted to be used with a number of different configurations of irrigation valves as well as providing more reliable operation than previously available in irrigation valve operation systems.

DETAILED DESCRIPTION OF THE PREFERRED EMBODIMENTS

Figure 1:
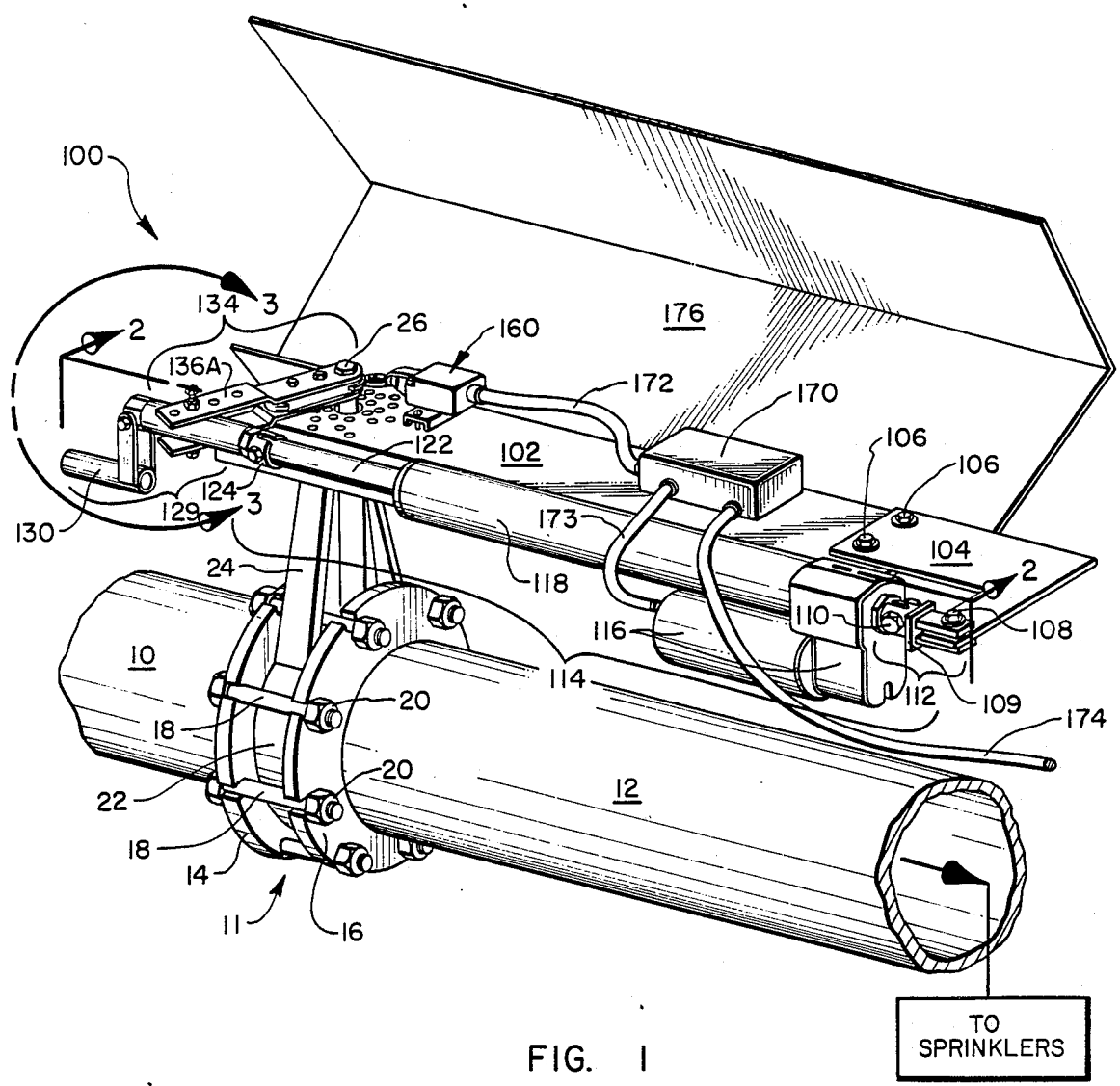
FIG. 1 is a perspective view of a presently preferred embodiment of the present invention which has been mounted on an irrigation valve which has in turn been installed in place between two pipe sections.

In the following description of the preferred embodiments, like components will be provided with like alpha-numeric designations. Also, adjectives such as "upper" and "lower" will be used for convenience when referring to the drawings. However, it is to be understood that the following description is not intended to limit the scope of the present invention but merely to represent the presently preferred embodiments of carrying out the underlying inventive concepts.

The first presently preferred embodiments of the present invention is generally designated 100 in FIG. 1. The first embodiment is illustrated as being installed on an irrigation valve generally indicated at 11. Both a first pipe section 10 and a second pipe section 12 are provided with flanges 14 and 16, respectively.

Valve 11, which is a butterfly valve of the type commonly used in irrigation systems, has its body 22 held between pipe flanges 14 and 16 with bolts 18 and nuts 20 located around the flange perimeter and tightened to maintain a fluid tight coupling between valve body 22 and pipe sections 10 and 12.

The valve is provided with neck 24 which extends upwardly from valve body 22. As shown best in FIG. 4, the upper most end of neck 24 is provided with a flat valve head portion 30 having a plurality of mounting holes represented at 32. Protruding above valve head is valve stem 26. By rotating valve stem 26 about 90° the valve is moved between its fully closed and fully open positions.

It should be understood that while the preferred embodiments are described using the illustrated valve (which is preferred for use in irrigation systems), other types of valves may also have application with the present invention. For example, sluice gate, or screw down valves may have application with the present invention. It should be appreciated that when other valves are used it may be necessary to rotate the valve stem more or less than 90° to operate the valve.

As shown best in FIG. 1, the components of the presently preferred embodiment are attached to mounting plate 102. The structures used to attach mounting plate 102 to any one of an assortment of valves, which advantageously provides one aspect of the the adaptability of the present invention, will be more fully described later in this disclosure.

As illustrated in FIG. 1, attached to mounting plate 102 by way of bolts 106 is thrust bracket 104. Thrust bracket 104, in cooperation with pivot joint assembly 112 (consisting of a pivot hinge 109 secured to thrust bracket 104 by way of bolt 108 and to linear actuator assembly 114 by way of bolt 110) holds the linear actuator assembly (generally indicated by bracket 114) in the proper position while allowing the linear actuator to pivot somewhat as the rod is extended and retracted.

Linear actuator assembly 114 used in the presently preferred embodiment is preferably of a type manufactured by Warner Electric Co., Model No. A120-10B5-12D. Linear actuator 114 includes an integral electrical motor and transmission designated 116 in FIG. 1. When proper electrical power is applied to motor 116, rod 122 may be either extended out of, or retracted into, housing 118.

The specified actuator 114 is preferred for use in the described embodiments since it includes a housing and associated seals which make it nearly impervious to harsh environmental weather conditions experienced by an irrigation system as well as being resistant to damage due to physical wear and abuse. Also, actuator 114 includes a clutch mechanism which prevents damage from occuring if the system should become jammed during operation.

Pivot joint assembly 112 is necessary in order to allow limited movement of actuator 114 in the horizontal plane while rod 122 is being extended and retracted. Greater detail concerning actuator 114, and the components associated therewith, will be provided shortly in connection with FIG. 2.

Also illustrated in FIG. 1 is a connecting arm assembly (generally indicated by bracket 134) which serves to transfer the linear motion of the rod 122 into the rotational movement of valve stem 26 thus causing the opening and closing of the valve.

Also shown in FIG. 1 is the manual operation assembly (generally indicated by bracket 129) which includes handle 130. Manual operation assembly 129 is provided to allow the user to manually operate the presently preferred embodiment without disconnecting or removing any of the system components. This feature is extremely useful in case of events such as power failures.

Also illustrated in FIG. 1 are the components comprising the control circuit or the control means of the presently preferred embodiment. The control circuit of the presently preferred embodiment includes limit switch 160, junction box 170 and cables 172, 173, and 174.

Limit switch 160 is preferably of the type manufactured by Telemecanique, Inc. and marketed as XCK-L limit switches. Alternatively, limit switch 160 may be one of the many microswitches commercially available. Junction box 170, cables 172, 173, and 174 and any other components necessary to complete the control circuit of the preferred embodiment may be readily obtainable from commercial suppliers of such items.

Primarily, the control circuit of the illustrated embodiment must be wired to the irrigation control system such that opening or closing of the valve begins when power is applied to the embodiment by way of cable 174 and power must be removed from actuator assembly 114 when the valve has reached its fully open or fully closed position as sensed by limit switch 160. In the illustrated embodiment, junction box 170 need only include a starting capacitor for the electric motor contained in actuator 114 and the wiring connectors necessary to properly interconnect limit switch 160 and actuator 114 with the conductors of cable 174.

It will be realized by those skilled in the art that the present embodiment may be operated from a remote location or may be adapted to operate automatically such as with a timing mechanism.

It will be appreciated that those skilled in the art will be able to readily devise the appropriate wiring circuits required to operate the presently preferred embodiment using the components designated herein. Thus, a detailed discussion concerning the wiring of the preferred embodiment will not be included herein.

Also illustrated in FIG. 1 is a cover 176 which is hinged to mounting plate 102. One of the hinges is illustrated in both FIGS. 3 and 4. It will be appreciated that cover 176 serves to shield the workings of the presently preferred embodiment from any adverse affects of snow, rain, and direct exposure to the sun, and also ensure that bystanders are not injured due to the unexpected automatic operation of the embodiment. Cover 176 is shown in its raised position and may be lowered into position to cover the apparatus components. Significantly, since the described embodiments utilize an unsealed cover, the problems with condensation and servicing which accompany the use of sealed housings is avoided.

Figure 2:
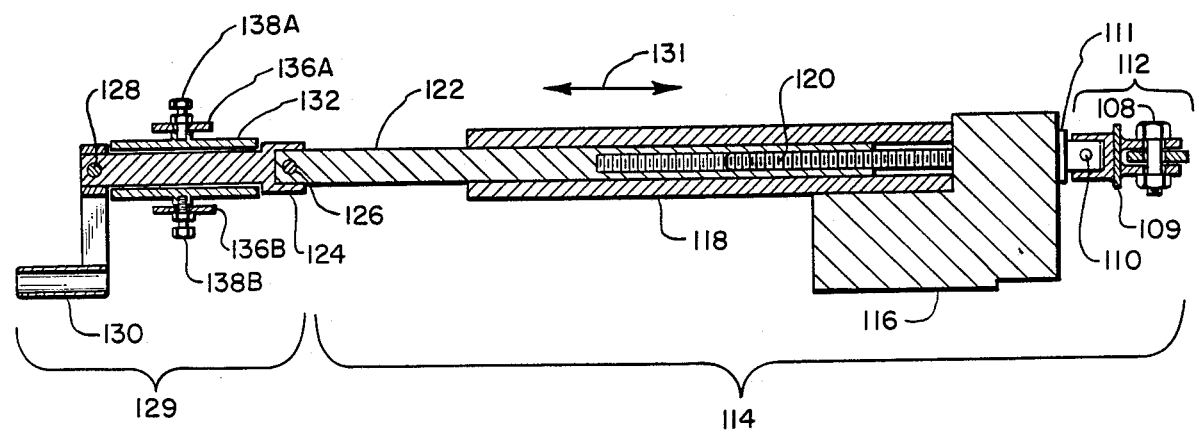
FIG. 2 is a cross sectional view of the linear actuator assembly and manual operation assembly included in the embodiment illustrated in FIG. 1.

Illustrated in FIG. 2 is a cross sectional view of linear actuator assembly 114 which is shown in FIG. 1. Also shown in FIG. 1 is manual operation assembly 129. As mentioned earlier, the illustrated embodiment preferably incorporates an actuator which is manufactured by Warner Electric. However, various other types of linear actuators (as opposed to rotary motors) may be used with the present invention. For example, pneumatic and hydraulic linear actuators may advantageously be used in particular applications of the present invention.

In the presently preferred embodiment, actuator 114 is also referred to as a reciprocating rod means since rod 122 extends and retracts in a reciprocating fashion. Actuator 114 is capable of providing a twelve inch stroke. Other stroke lengths, however, may be desirable in some applications. For example, if more torque were needed to operate a larger valve, connecting arm assembly 134 may be lengthened which may require a longer stroke from actuator 114. Also, connecting arm assembly 134 may be lengthened to decrease the closing time of the valve.

Also, as mentioned, actuator assembly 114 is provided with a strong damage resistant and weather sealed housing. The orientation of actuator 114 and the placement of the motor and transmission within the housing make the actuator particularly weather resistant and useful for incorporation into the present invention.

Furthermore, actuator 114 is of the type which includes an anticoast motor brake to allow accurate stopping of rod 122 once power is removed from the motor. Actuator 114 preferably includes a clutch (not explicitly shown in the drawings) which releases the drive screw from the motor if the maximum stroke is reached or if the maximum load of the actuator is exceeded. It will be realized that the use of actuator 114 provides a much more reliable source of motion to open and close valves than the conventional rotary electric motors and the like previously available.

In the cross-sectional view of actuator 114 shown in FIG. 2, the electric A.C. motor and transmission are represented at 116. In order to extend or retract rod 122, drive screw 120 is rotated by the electric motor and transmission mechanism 116 in either a clockwise or counterclockwise direction. Since drive screw 120 is threadably connected to rod 122, rod 122 will be extended or retracted as drive screw 120 rotates if rod 122 is kept from rotating.

The feature of allowing rod 122 to freely rotate within housing 118 unless restrained by the manual operation assembly is important to the proper functioning of the manual operation assembly as will be explained below. It will be appreciated that the internal details of actuator 114 are not illustrated in the drawings and that housing 118 of the presently preferred embodiment includes structures to guide rod 122 as well as structures to provide a seal against the entry of harmful dirt and moisture within housing 118.

Mounting post 111 is provided on actuator 114 and allows convenient attachment of the actuator to pivot hinge assembly 112. The structure of pivot hinge assembly 112 as well as its connection to mounting post 111 and thrust bracket 104 can be clearly seen in a cross sectional view of FIG. 2.

An understanding of the general operation of the illustrated embodiment will explain the need for pivot hinge assembly or some other similarly functioning structure. As rod 122 is extended or retracted, the distal end of the rod will travel in an arc determined by the effective length of the connecting arm assembly. Thus, actuator 114 must be allowed to move somewhat in a horizontal plane while still being able to extend and retract rod 122.

The components comprising the manual operation assembly of the presently preferred embodiment are indicated at bracket 129 in FIG. 2. Manual operation assembly 129 includes shaft 124, sleeve 132, and handle 130. A first end of shaft 124 is fixed to the end of rod 122 by way of a recess provided in the shaft and bolt 126 inserted through bores provided through the circumference of both the shaft and the rod.

A second end of shaft 124 is connected to handle 130 by way of bolt 128. Handle 130 is connected so it is allowed to pivot in the direction designated by arrow 127 in FIG. 3. Handle 130 is provided to allow a user to manually open or close the irrigation valve by rotation of the handle.

When manual operation is desired, a user may grasp handle 130 and rotate the same. As explained, the motor brake included in actuator 114 will prevent rotation of drive screw 120 unless power is applied to the motor. Thus, by using handle 130 to rotate rod 122, the rod will be extended or retracted causing the opening or closing of the valve.

In FIGS. 1, 2, 4, and 5, handle 130 is shown in a position to allow manual operation of the valve while in FIG. 3 the solid image of the handle is positioned to allow operation of the valve by way of actuator 114 as will be explained in greater detail below. It will be appreciated that the valve may be opened or closed manually without requiring removal or disconnection of any of the components of the embodiment.

As shown best in FIG. 2, shaft 124 extends through the hollow length of sleeve 132. Thus, when handle 130 is in the position shown in FIG. 2, handle 130, shaft 124, and rod 122 freely rotate and, depending upon the direction of rotation, cause rod 122 to move in one of the directions indicated by arrow 131 in FIG. 2. However, because shaft 124 is captured by sleeve 132, the connecting arm assembly also moves.

The functioning of the connecting arm assembly and the manual operation assembly can be best explained by reference to FIG. 3 in conjunction with FIG. 2. As shown in FIG. 3, connecting arm assembly 134 includes a clevis-like structure comprising upper and lower extension arms, 136A and 136B, respectively, as well as valve stem adaptor 146. As shown in FIGS. 2 and 3, upper extension arm 136A is pivotally attached to sleeve 132 by way of bolt 138A. Similarly, lower extension arm 136B is pivotally attached to the lower side of sleeve 132 by way of bolt 138B.

Figure 3:
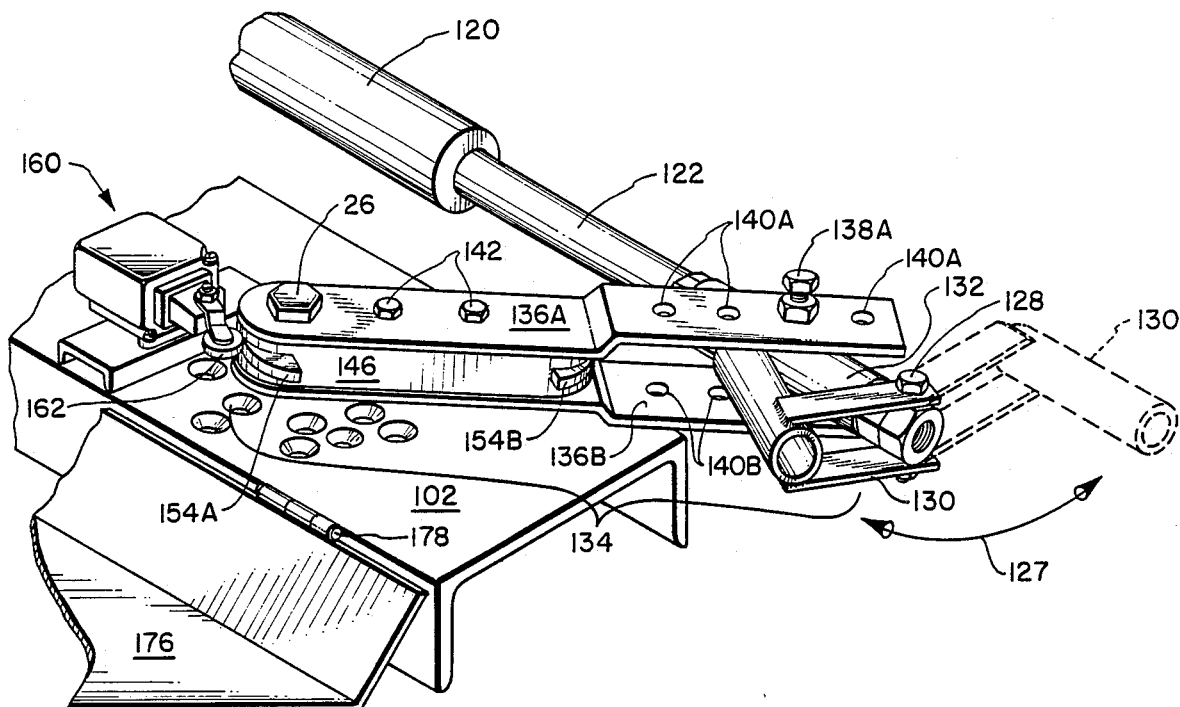
FIG. 3 is a perspective view of the connecting arm assembly, manual operation assembly, and other components of the embodiment illustrated in FIG. 1.

As seen best in FIG. 3, handle 130 may be pivoted from its manual operation position (shown in a phantom outline) to an automatic operation position or "folded" position where handle 130 is kept from rotating by upper and lower extension arms 136A and 136B. It may also be desirable to provide a mechanism (not shown in the drawings) to secure handle 130 in the "automatic" or "folded" position to ensure that the handle does not inadvertently loosen and slip into the manual position during operation of the embodiment. It is usually the case, however, that the friction between the components keeps handle 130 in the proper position. Thus, when handle 130 is in the position shown by the solid image illustrated in FIG. 3, rod 122 is kept from rotating and the actuator mechanism may extend or retract rod 122.

Also, a careful examination of FIG. 2 and FIG. 3 will show that the structure of shaft 124 and sleeve 132 will transfer the motion of rod 122 to extension arms 138A and 138B in order to operate the valve. Those skilled in the art will appreciate that it may be desirable in some situations to include antifriction surfaces or bearings in the interface between sleeve 132 and shaft 124.

Figure 4:
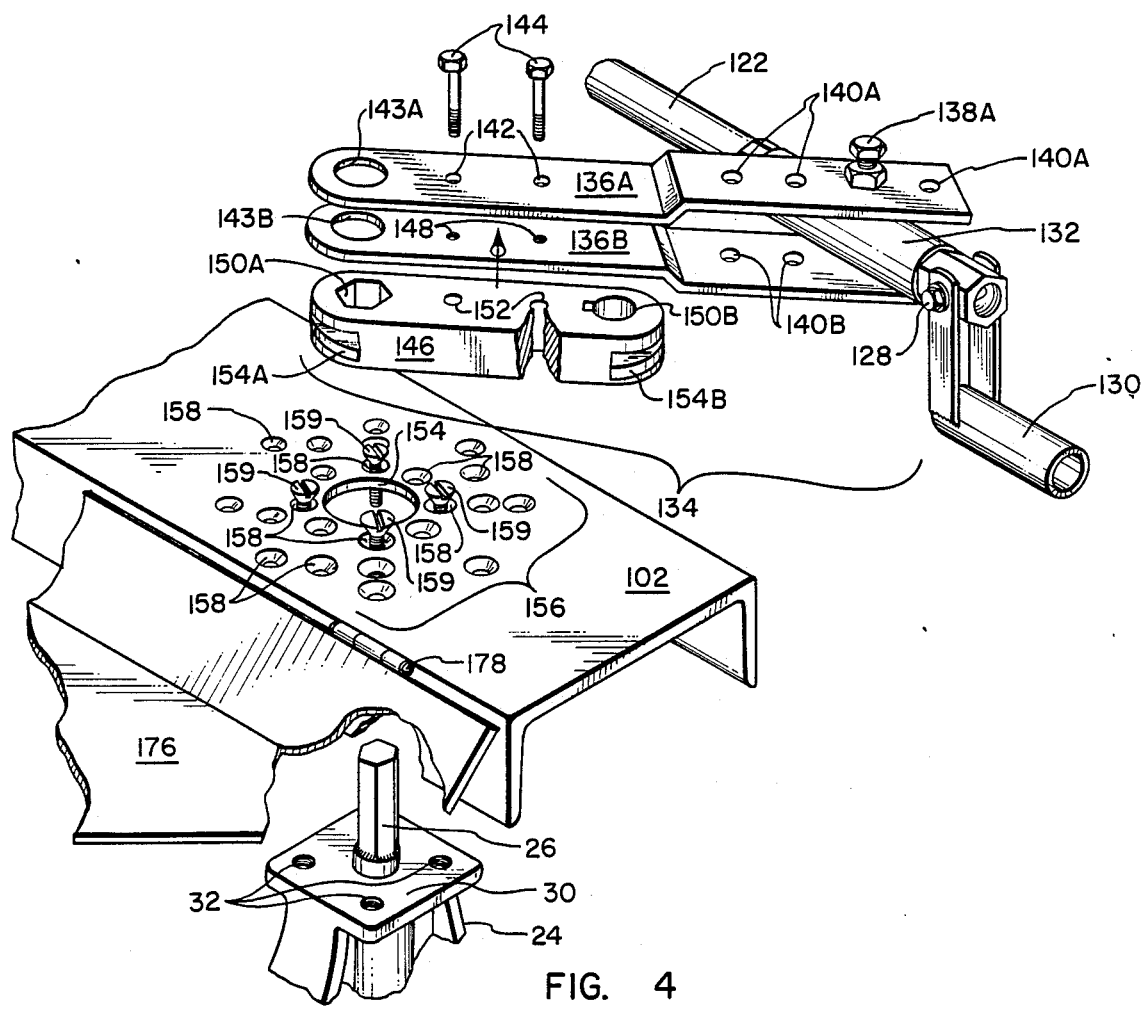
FIG. 4 is an exploded perspective view of the connecting arm assembly illustrated in FIG. 3.

As can be observed best in FIG. 4, both upper and lower extension arms 138A and 138B are provided with a plurality of bores 140A and 140B through which bolts 138A and 138B may be disposed. By providing a plurality of bores by which sleeve 132 may be connected to arms 136A and 136B, the effective length of the connecting arm assembly may be varied. Importantly, since the rate of extension and retraction of linear actuator assembly 114 is fairly constant, varying the effective length of the connecting arm assembly provides a means for varying the opening and closing time of the valve.

As mentioned previously, a closing time which is too short may result in the rapid buildup of pressure in the pipe and cause it to burst. Thus, if a longer closing time is desired, sleeve 132 may be attached to extension arms 136A and 136B by way of bores 140A and 140B which are nearer the distal end of the extension arms. If a shorter closing time is desired, sleeve 132 should be attached to extension arms 136A and 136B at a bore more proximate to valve stem 26. Also, it will be appreciated that the torque applied to valve stem 26 increases as the effective length of connecting arm assembly 134 increases.

As shown best in FIG. 4, valve stem adaptor 146 is provided with two valve stem receptacles 150A and 150B. As mentioned previously, in addition to various valves having different mounting head configurations, the valve stems generally differ in shape and size also. Thus, the inclusion of valve stem adaptor 146 having two different valve stem receptacles 150A and 150B allows the present invention even greater adaptability.

The structures of the manual operation assembly and the connecting arm assembly may be fabricated from well known materials such as steel. Those skilled in the art will be able to choose particular materials best suited for specific applications.

As indicated in FIG. 4, valve stem adaptor 146 is inserted between the upper and lower extension arms and bolts 144 are inserted through bores 142 and 152 into threaded bores 148. Thus, valve stem adaptor 146 is held securely between upper and lower extension arms 136A and 136B, respectively.

With valve stem adaptor 146 in place, valve stem 26 may be inserted through bores 143A and 143B provided in upper and lower extension arms and the valve stem will be securely held by receptacle 150A represented in FIG. 4. A set screw (not shown in the drawings) may be included in adaptor 146 to ensure that the adaptor remains securely attached to valve stem 26.

It will be appreciated that adaptor 146 may be provided with more than two valve stem receptacles. For example, a series of valve stem receptacles could be provided along the length of adaptor 146. In this way, a single adaptor may be used with many valve stems. Alternatively, as illustrated, each adaptor may be provided with only two stem receptacles but a plurality of adaptors may be readily supplied to maintain the adaptability of the embodiment.

As explained earlier, it is common for a myriad of different brands and configurations of irrigation valves to be used on a farming operation. An object of the present invention is to provide a single embodiment, or an embodiment having easily interchangeable parts, which is adaptable for use with a large number of valves.

Thus, a primary advantage of the present invention is that the number of components which must be stocked by a farmer or field service representative to service all of the different valves which might be encountered is minimized. As just explained, a small number of different valve stem adaptors may be easily stocked or a single valve stem adaptor may be provided with two or more valve stem receptacles. Either alternative provides great adaptability without significant extra expense or inconvenience.

In order to extend the described embodiment's adaptability even further, mounting plate 102, as represented best in FIG. 4, is provided with a plurality of mounting holes (generally designated by bracket 156) which allow mounting plate 102 to be securely attached to valve head 30 by insertion of bolts 159 or machine screws through the appropriate mounting holes. For example, the mounting holes designated 158 in FIG. 4 are those which correspond to valve head mounting holes 32 shown in FIG. 4.

Also, bore 154 (provided in mounting plate 102) must be large enough to allow passage of the valve stem 26 and to allow mounting plate 102 to be firmly seated on valve head 30. The arrangement of mounting holes 156 may be planned to adapt to any number of different valves and the arrangement shown in the figures is merely representative of one possibility.

It will be appreciated that a plurality of sets of mounting holes could be provided on mounting plate 102 to allow a single mounting plate to be used with a large number of different valves. Thus, the present invention may be readily adapted to allow a single embodiment of the invention to be used with nearly any irrigation valve by only providing minor changes in the components of the system. Thus, when the present invention is used, it is no longer necessary to stockpile a large number of different spare parts to provide efficient repair service for almost any irritation valve operation system. It will be appreciated that this is a great advantage to both the farmer and the field service representative who is faced with repair or replacement of valve operation systems.

The control circuit of the presently preferred embodiment comprises primarily electrical devices and connections well known to those in the art.

As indicated earlier, a microswitch or limit switch 160 (as shown best in FIG. 3), is included to remove power from the actuator motor when the valve has been fully opened or fully closed. Switch 160 senses the position of the valve stem by way of cam surfaces 154A and 154B provided on the ends of stem adaptor 146.

Cam surfaces 154A and 154B are carefully positioned in relation to the orientation of stem receptacles 150A and 150B, respectively, so that limit switch 160 will be tripped at the proper point. Switch 160 is provided with a roller 162 at the distal end of its lever to provide smooth operation with the cam surface.

It is desirable to mount switch 160 onto mounting plate 102 in such a way that the position of the switch may be finely adjusted to cause shut off of the actuator motor just as the valve is fully closed or fully opened.

It will be appreciated that utilization of switch 160 allows remote activation of the system by merely applying power to either open or close the valve for an adequate length of time while the switch ensures that the linear actuator motor is turned off just as the fully opened or fully closed position is reached. Thus, inclusion of limit switch 160 allows a simple wiring and control scheme in combination with positive control during opening and closing cycles. Those skilled in the art will readily appreciate the advantage of such a scheme and how it may be carried out using the disclosed components as well as other available components.

The above-described embodiment may be easily incorporated into all electric irrigation control systems generally available. When opening of the valve is desired, a timer or remote actuation mechanism applies electrical power to the proper pair of conductors in cable 174. If the valve is not already fully open, motor 116 in actuator assembly 114 starts so as to retract rod 122. As soon as the valve is fully opened, switch 160 is tripped and power is removed from motor 116.

Importantly, it is not necessary to precisely time the length that power is applied to the conductors of cable 174 since motor 116 will stop when the fully opened position is reached. Even if switch 160 fails, actuator 114 includes a clutch mechanism which will prevent serious damage to the embodiment. It should be realized that this is a great advantage over previously available devices without any type of "safety mechanism."

When closing of the valve is desired, power is applied to another pair of conductors in cable 174 which causes rod 122 to extend. As soon as the valve is fully closed, switch 160 is again tripped and power is removed from motor 116. It will be appreciated that the embodiment of the present invention may be configured to either close or open the valve when the rod is extended. However, it is preferred the embodiment be configured so that rod is retracted into the housing most of the time, i.e., when the valve is in its "normal" position, to reduce any likelihood of damage to the exposed rod and reduce the amount of dust and dirt which settles thereon.

In many cases, it is desirable to control the pressure within a pipe "downstream" from the valve. For example, many sprinkler irrigation devices work best within a specified range of pressures. Thus, the embodiment of the invention illustrated in FIG. 5 includes a pressure regulation device within the control circuit.

Figure 5:
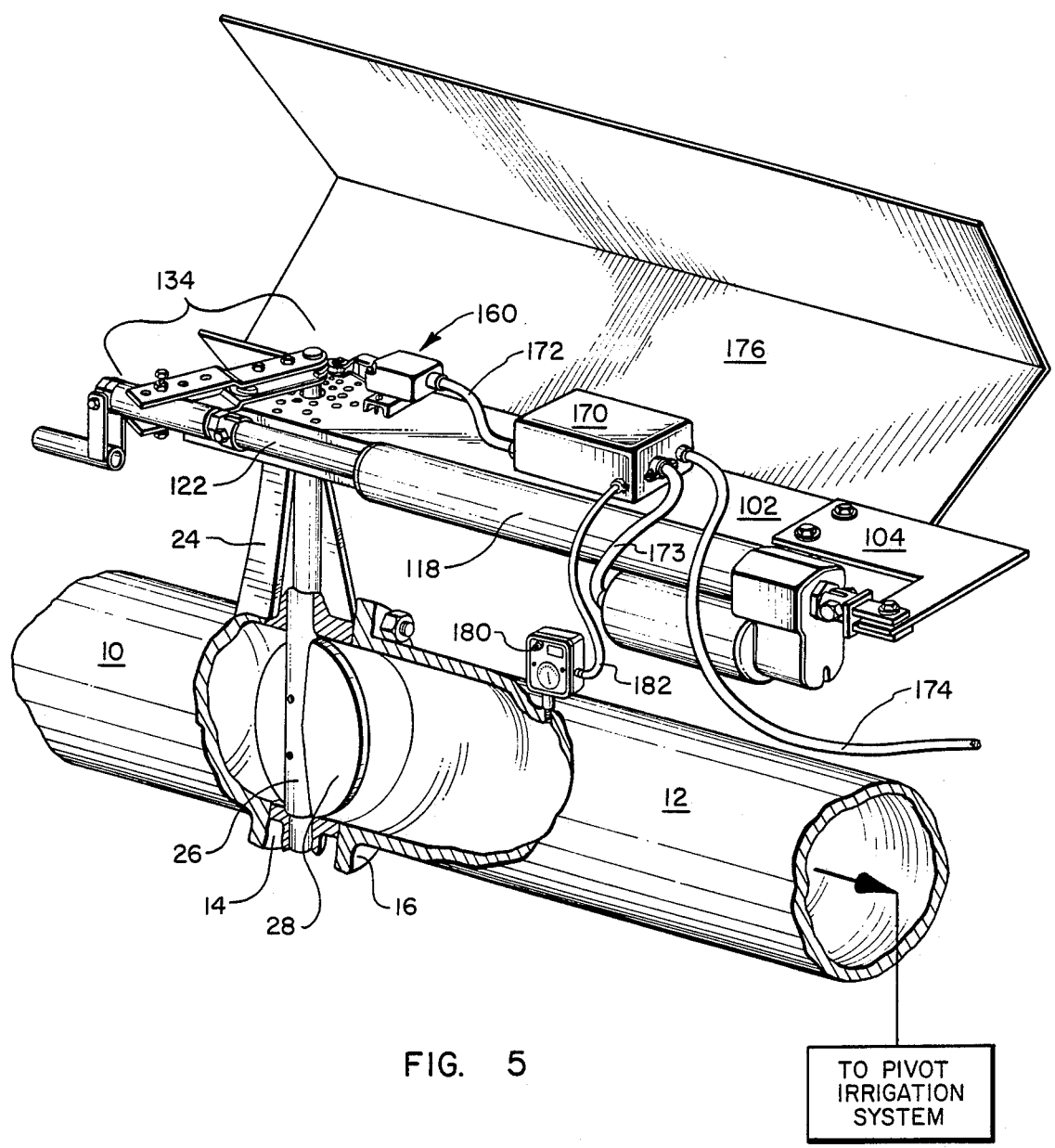
FIG. 5 is a partially cut away perspective view of another presently preferred embodiment of the present invention which includes an automatic pressure regulation control circuit.

As illustrated in FIG. 5, pressure regulation device 180 directly senses the pressure within pipe 12. Pressure regulation device 180 is electrically connected to junction box 170 by way of cable 182. Again, those skilled in the art will be able to readily devise the necessary wiring to incorporate one of the many available pressure sensing devices into the control circuit. With pressure regulation device 180 installed, the position of valve disc 28 is adjusted to maintain constant pressure in pipe section 12.

One pressure regulation device capable of use in the embodiment illustrated in FIG. 5 is available from Frank W. Murphy Manufacturing, of Tulsa, Okla., and marketed under the trademarks OPL Series pressure SWICHGAGE®. Other than the changes to the control circuit required to insert the pressure regulating device, the components of the "pressure regulating" embodiment may be the same as those of the previously described embodiment.

As will be appreciated from the foregoing description, embodiments of the present invention provide the great advantage of being adaptable for use with a variety of different valves with a minimum of component exchange or adjustment. This feature is particularly desirable when dealing with irrigation valves.

Also, the present invention provides a valve operation system which is much more resistant to damage and wear than previously available systems. Resistance to damage and wear is important in irrigation system applications where valve operators are expected to work unattended long periods of time at remote locations and under harsh conditions.

The present invention also provides the advantages of incorporating readily obtainable or easily fabricated parts into the system and also provides a valve operation system which requires little maintenance. The present invention also allows different closing rates to be easily set as well as being adaptable for use on both large and small valves.

The present invention is also easily adaptable for use with conventional electrical irrigation control systems and also may be adapted for use with other types of control systems. Significantly, the present invention also allows the convenient manual operation of the irrigation valve.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for operating an irrigation valve in an irrigation system, the valve having a valve stem and a valve body, the opening and closing of the valve being controlled by rotation of the valve stem, the system comprising:
- reciprocating rod means for extending and retracting a rod from a housing;
- connecting arm means having first and second ends, said first end attached to the valve stem and said second end attached to the rod such that the extension and retraction of the rod causes the rotation of the valve stem;
- mounting means for holding the reciprocating rod means in position in relation to the valve body, said mounting means comprising means for alternately attaching the mounting means to a first irrigation valve having a first mounting configuration and to a second irrigation valve having a second mounting configuration; and
- control means for selectively causing the reciprocating rod means to selectively extend and retract the reciprocating rod such that the irrigation valve is operated and the amount of water flowing to the irrigation system downstream from the valve is controlled.

2. A system for operating an irrigation valve as defined in claim 1 wherein the reciprocating rod means comprises:
- an electric motor; and
- a drive mechanism which translates the rotational motion of the electric motor to linear motion of the reciprocating rod.

3. A system for operating an irrigation valve as defined in claim 2 wherein the electric motor is a reversible electric motor.

4. A system for operating an irrigation valve as defined in claim 1 further comprising cable means for operating the irrigation system from a remote location.

5. A system for operating an irrigation valve as defined in claim 1 further comprising means for pivotally attaching the reciprocating rod means to the mounting means.

6. A system for operating an irrigation valve as defined in claim 1 wherein the mounting means comprises a mounting plate and wherein the means for alternately attaching the mounting means comprises a plurality of mounting holes arranged for allowing the mounting plate to be alternately secured to at least two differing valves.

7. A system for operating an irrigation valve as defined in claim 1 wherein the control means comprises a switch positioned to sense the position of the valve stem.

8. A system for operating an irrigation valve as defined in claim 7 wherein the control means further comprises a cam in rotational engagement with the valve stem and positioned to contact the switch.

9. A system for operating an irrigation valve as defined in claim 1 wherein the connecting arm means comprises a valve stem adaptor configured for attaching to the valve stem and allowing rotation thereof.

10. A system for operating an irrigation valve as defined in claim 1 wherein the connecting arm means comprises means for manually rotating the rod.

11. A system for operating an irrigation valve as defined in claim 1 wherein the connecting arm means comprises an extension arm which includes means for attaching the rod at one of a plurality of points along the extension arm.

12. A system for operating an irrigation valve as defined in claim 1 wherein the system further comprises a thrust bracket, the thrust bracket including means for attaching to the mounting means and to the reciprocating rod means.

13. A system for operating an irrigation valve as defined in claim 1 further comprising a manual close assembly means for allowing a user to manually operate the valve.

14. A system for operating an irrigation valve as defined in claim 1 wherein the irrigation system comprises a plurality of sprinklers.

15. A system for operating an irrigation valve as defined in claim 14 wherein the irrigation system comprises a pivot irrigation system.

16. A system for operating an irrigation valve as defined in claim 1 wherein the valve is a butterfly valve.

17. A system for operating an irrigation valve as defined in claim 1 wherein the valve is operated between a fully opened and a fully closed position by rotation of the valve stem in the range from about 10° to about 180°.

18. A system for operating an irrigation valve as defined in claim 1 wherein the valve is operated between a fully opened and a fully closed position by rotation of the valve stem in the range from about 40° to about 120°.

19. A system for operating an irrigation valve as defined in claim 1 wherein the valve is operated between a fully opened and a fully closed position by rotation of the valve stem in the range from about 80° to about 100°.

20. A system for opening and closing an irrigation valve in an irrigation system including a plurality of sprinklers, the valve having a valve body and a valve stem, the valve being opened and closed by rotation of the valve stem, the system comprising:
- reciprocating rod means for extending and retracting a rod from a housing;
- connecting arm means including valve stem adaptor means and extension arm means, the connecting arm means interconnecting the rod and the valve stem;
- mounting means for holding the reciprocating rod means in place, said mounting means comprising a plurality of mounting holes, the mounting holes arranged to allow the mounting plate to be secured to at least two different irrigation valves having different mounting configurations; and
- control means for operating the reciprocating rod means such that as the rod is extended and retracted the valve stem is rotated and the valve is operated.

21. A system for opening and closing an irrigation valve as defined in claim 20 wherein the reciprocating rod means comprises:
- an electric motor;
- a transmission connected to the electric motor; and
- a drive screw threadably engaging the rod and driven by the transmission.

22. A system for opening and closing an irrigation valve as defined in claim 21 wherein the reciprocating rod means further comprises a brake provided on the motor.

23. A system for opening and closing an irrigation valve as defined in claim 20 further comprising a manual operation assembly including a handle and means for rotating the rod by way of the handle.

24. A system for opening and closing an irrigation valve as defined in claim 20 wherein the valve comprises a butterfly valve.

25. A system for opening and closing an irrigation valve as defined in claim 20 wherein the stem adaptor means comprises at least two valve stem receptacles provided thereon.

26. A system for opening and closing an irrigation valve as defined in claim 20 wherein the extension arm means comprises a member having a proximal end and a distal end, the proximal end being connected to the stem adaptor means and the distal end having a plurality of locations whereat the rod may be connected.

27. A system for opening and closing an irrigation valve as defined in claim 20 wherein the connecting arm means comprises means for altering the closing time of the valve.

28. A system for opening and closing an irrigation valve as defined in claim 20 wherein the plurality of mounting holes are arranged to allow bolts to pass therethrough and into the bores provided on at least a first valve head and a second valve head.

29. A system for opening and closing an irrigation valve as defined in claim 20 wherein the mounting means comprises a mounting plate and a thrust bracket connected thereto and wherein the reciprocating rod means is connected to the thrust bracket.

30. A system for opening and closing an irrigation valve as defined in claim 29 wherein the mounting means further comprises a hinge interconnecting the reciprocating rod means to the thrust bracket to allow the reciprocating rod means to pivot in one plane.

31. A system for opening and closing an irrigation valve as defined in claim 20 wherein the control means comprises a switch.

32. A system for opening and closing an irrigation valve as defined in claim 31 wherein the control means further comprises a cam surface positioned to be sensed by the switch and wherein the switch is positioned such that it is tripped when the valve has reached a fully closed or fully opened position and motion of the rod is halted.

33. A system for opening and closing an irrigation valve as defined in claim 20 further comprising a manual operation assembly comprising:
 a sleeve pivotally attached to the connecting arm means;
 a shaft axially attached to the rod and passing through the sleeve and axially captured thereby; and
 a handle connected to a second end of the shaft and adapted to allow a user to manually rotate the shaft and rod.

34. A system for opening and closing an irrigation valve as defined in claim 20 wherein the control means comprises a pressure sensing device interfaced with the reciprocating rod means.

35. An irrigation valve operation system for use with valves having a valve body and a valve stem, rotation of the valve stem operating the valve between a fully open and a fully closed position, the system comprising:
 a mounting plate, the mounting plate having a plurality of sets of mounting fastener holes, each set of mounting fastener holes adapted to allow a plurality of fasteners to alternately secure the mounting plate to at least two valves having different mounting configurations;
 a linear actuator including an electric motor, a housing, and a rod which may be selectively extended from and retracted into the housing;
 a thrust bracket, the thrust bracket including means for connecting the thrust bracket to the linear actuator housing and means for connecting the thrust bracket to the mounting plate such that the linear actuator may be held in about the same position as the rod is extended and retracted;
 a connecting arm assembly comprising a valve stem adaptor adapted for grasping the valve stem such that the valve stem may be rotated thereby and an extension arm adapted for transferring the movement of the rod to the valve stem adaptor; and
 a control circuit comprising a switch for detecting when said valve is fully opened and fully closed and means for carrying electrical power to the linear actuator such that the irrigation valve may be opened and closed upon command by an irrigation control system.

36. An irrigation valve operation system as defined in claim 35 wherein the valve stem adaptor comprises a plurality of valve stem receptacles.

37. An irrigation valve operation system as defined in claim 35 wherein the extension arm comprises a plurality of attachment points along its length whereat it may be coupled to the rod.

38. An irrigation valve operation system as defined in claim 35 wherein the control circuit further comprises a pressure sensing device interfaced with the limit switch and the linear actuator.

39. An irrigation valve operation system as defined in claim 35 wherein the irrigation valve is a butterfly valve.

40. An irrigation valve operation system as defined in claim 35 further comprising a cover.

41. An irrigation valve operation system as defined in claim 35 further comprising a manual operation means.

42. An irrigation valve operation system as defined in claim 35 wherein the control means further comprises a cam surface provided on the valve stem adaptor, the cam surface contacting the switch and tripping the switch when the valve is in a fully closed position.

* * * * *

UNITED STATES PATENT AND TRADEMARK OFFICE
CERTIFICATE OF CORRECTION

PATENT NO. : 4,961,538

DATED : October 9, 1990

INVENTOR(S) : RONNIE D. HEWITT

It is certified that error appears in the above-identified patent and that said Letters Patent is hereby corrected as shown below:

Column 1, line 22, "to adjacent" should be --adjacent to--
Column 6, line 3, delete second occurrence of "the"
Column 15, line 20, "are" should be --is--

Signed and Sealed this

Twenty-second Day of September, 1992

*Attest:*

DOUGLAS B. COMER

*Attesting Officer*     *Acting Commissioner of Patents and Trademarks*